(12) United States Patent
Ward et al.

(10) Patent No.: US 10,066,883 B1
(45) Date of Patent: *Sep. 4, 2018

(54) HEAT MANAGEMENT AND THERMAL SHIELDING TECHNIQUES USING COMPRESSED CARBON NANOTUBE AEROGEL MATERIALS

(71) Applicant: LOCKHEED MARTIN CORPORATION, Bethesda, MD (US)

(72) Inventors: Jonathan W. Ward, San Jose, CA (US); James M. Spatcher, North Kingstown, RI (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/415,799

(22) Filed: Jan. 25, 2017

Related U.S. Application Data

(62) Division of application No. 13/886,238, filed on May 2, 2013, now Pat. No. 9,581,282.

(Continued)

(51) Int. Cl.
*F28F 21/02* (2006.01)
*B21D 53/02* (2006.01)

(52) U.S. Cl.
CPC ............. *F28F 21/02* (2013.01); *B21D 53/02* (2013.01)

(58) Field of Classification Search
CPC ........ F28F 21/02; B21D 53/02; C01B 31/022; C01B 31/0226; C01B 31/0233; C01B 31/024; C01B 31/0246; C01B 31/0253; C01B 31/026; C01B 31/0266; C01B 31/0273; C01B 31/028; C01B 31/0286; C01B 31/0293; C01B 2202/00;

(Continued)

(56) References Cited

U.S. PATENT DOCUMENTS 8,911,859 B1    12/2014   Spatcher
9,581,282 B1 *   2/2017   Ward .................... F16L 59/029

(Continued)

OTHER PUBLICATIONS

Lau, et al., Superhydropyhobic Carbon Nanotube Forests, Nano Letters 2003; 3(12): 1701-1705.*

(Continued)

*Primary Examiner* — Daniel C McCracken
(74) *Attorney, Agent, or Firm* — McDermott Will & Emery LLP

(57) ABSTRACT

Compressed carbon nanotube aerogel materials can be used in heat management and thermal shielding applications. Methods for heat management and thermal shielding of an object can include placing a compressed carbon nanotube aerogel material between an object and its surrounding environment, and establishing a thermal gradient within the compressed carbon nanotube aerogel material by exposing the compressed carbon nanotube aerogel material to the object or to the surrounding environment. When the object and the surrounding environment are in thermal communication with one another, the compressed carbon nanotube aerogel material can reduce an amount of heat transferred between the object and the surrounding environment. As a result of establishing the thermal gradient within the compressed carbon nanotube aerogel material, an electric current may be generated in some instances.

14 Claims, 3 Drawing Sheets

Related U.S. Application Data

(60) Provisional application No. 61/641,708, filed on May 2, 2012.

(58) Field of Classification Search
CPC ............ C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B82Y 5/00; B82Y 10/00; B82Y 15/00; B82Y 20/00; B82Y 25/00; B82Y 30/00; B82Y 35/00; B82Y 40/00; B82Y 99/00; D01F 9/10; D01F 9/127; D01F 9/1271; D01F 9/1272; D01F 9/1273; D01F 9/1274; D01F 9/1275; D01F 9/1276; D01F 9/1277; D01F 9/1278
See application file for complete search history.

(56) References Cited

U.S. PATENT DOCUMENTS

| | | | | |
|---|---|---|---|---|
| 2002/0150529 | A1* | 10/2002 | Dillon | B82Y 30/00 423/460 |
| 2002/0197474 | A1* | 12/2002 | Reynolds | B82Y 30/00 428/398 |
| 2003/0039604 | A1* | 2/2003 | Niu | B82Y 30/00 423/447.1 |
| 2004/0202603 | A1* | 10/2004 | Fischer | B01D 15/327 423/447.2 |
| 2012/0171411 | A1* | 7/2012 | Lashmore | B32B 5/022 428/114 |

OTHER PUBLICATIONS

Aliev, et al., Giant-Stroke, Superelastic Carbon Nanotube Aerogel Muscles, Science 2009; 323: 1575-1578.*

* cited by examiner

HEAT MANAGEMENT AND THERMAL SHIELDING TECHNIQUES USING COMPRESSED CARBON NANOTUBE AEROGEL MATERIALS

CROSS-REFERENCE TO RELATED APPLICATIONS

This application is a divisional of U.S. patent application Ser. No. 13/886,238, filed on May 2, 2013, now U.S. Pat. No. 9,581,282, which claims the benefit of priority under 35 U.S.C. § 119 from U.S. Provisional Patent Application 61/641,708, filed on May 2, 2012, each of which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to carbon nanotubes, and, more specifically, to thermal management techniques utilizing carbon nanotubes.

BACKGROUND

Carbon nanotubes have been proposed for use in a number of applications that take advantage of their unique combination of chemical, mechanical, electrical, and thermal properties. Carbon nanotubes display high mechanical strength values (>1 TPa), and a number of structural applications have been proposed, including use as a reinforcing filler in composite materials. Depending on their diameter and helicity, carbon nanotubes can behave as metallic conductors or semiconductors. The electrical conductivity of carbon nanotubes has led to the development of a wide array of devices incorporating carbon nanotubes including, for example, field effect transistors, memory devices and arrays, switches, vias, and other nanoscale electronic devices; batteries; supercapacitors; conductive wires and traces; and the like. The thermal conductivity of carbon nanotubes has led to a number of developments for facilitating heat transfer between surfaces, such as in thermal interface materials.

For heat transfer applications, individual carbon nanotubes can have exceptionally high thermal conductivity values. Along the longitudinal axis of individual carbon nanotubes, thermal conductivity values can range in the thousands of watts/m·K. In contrast, in the transverse direction (i.e., normal to the longitudinal axis), the thermal conductivity is relatively poor. Thus, proper carbon nanotube alignment to achieve optimal thermal conductivity can be desirable. Even in carbon nanotube thin films, alignment can be problematic, and in thicker carbon nanotube layers alignment can be much more difficult.

In many instances, carbon nanotubes have been deposited as a thin film on a substrate or dispersed in a matrix material when utilized in the foregoing applications and others. Thin film forms of carbon nanotubes can include both spin- or spray-coated carbon nanotube films conformally deposited onto a substrate and carbon nanotube mats, fabrics or papers that have been transferred to a desired substrate from another surface. Each of these thin film forms have been used successfully in a number of applications. However, none of these techniques are particularly scalable for bulk applications, particularly for constructing thicker carbon nanotube layers. Although multiple carbon nanotube mats can be placed upon one another to form thicker carbon nanotube layers, there can be sub-optimal nanotube-to-nanotube contact between the layered mats, thereby reducing the overall mechanical strength and electrical/thermal conductivity. Carbon nanotubes can also be directly grown onto a number of substrates (e.g., by chemical vapor deposition), but scalability can again be problematic in a number of instances and there is only limited opportunity to control the carbon nanotube morphology on the substrate.

In view of the foregoing, techniques that allow thicker carbon nanotube layers to be formed in a desired morphology and processed into three-dimensional articles would represent a significant advance in the art. The present disclosure satisfies the foregoing needs and provides related advantages as well.

SUMMARY

In some embodiments, the present disclosure describes methods including placing a compressed carbon nanotube aerogel material between an object and its surrounding environment, and establishing a thermal gradient within the compressed carbon nanotube aerogel material by exposing the compressed carbon nanotube aerogel material to the object or to the surrounding environment. The object and the surrounding environment are in thermal communication with one another, and the compressed carbon nanotube aerogel material reduces an amount of heat transferred between the object and the surrounding environment.

In some embodiments, the present disclosure describes methods including placing a compressed carbon nanotube aerogel material between an object and a heat sink that are in thermal communication with one another, where the object has a heat content; establishing a thermal gradient across a thickness of the compressed carbon nanotube aerogel material by exposing the compressed carbon nanotube aerogel material to the object or to the heat sink; and maintaining at least a portion of the heat content in the object by establishing the thermal gradient across the thickness of the compressed carbon nanotube aerogel material.

In some embodiments, the present disclosure describes articles that include one or more outer layers, and one or more inner layers containing a compressed carbon nanotube aerogel material, where at least one of the inner layers contacts an outer layer.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

The present disclosure is directed, in part, to heat management and thermal shielding techniques using compressed carbon nanotube aerogel materials. The present disclosure is also directed, in part, to articles containing compressed carbon nanotube aerogel materials.

Figure 1:
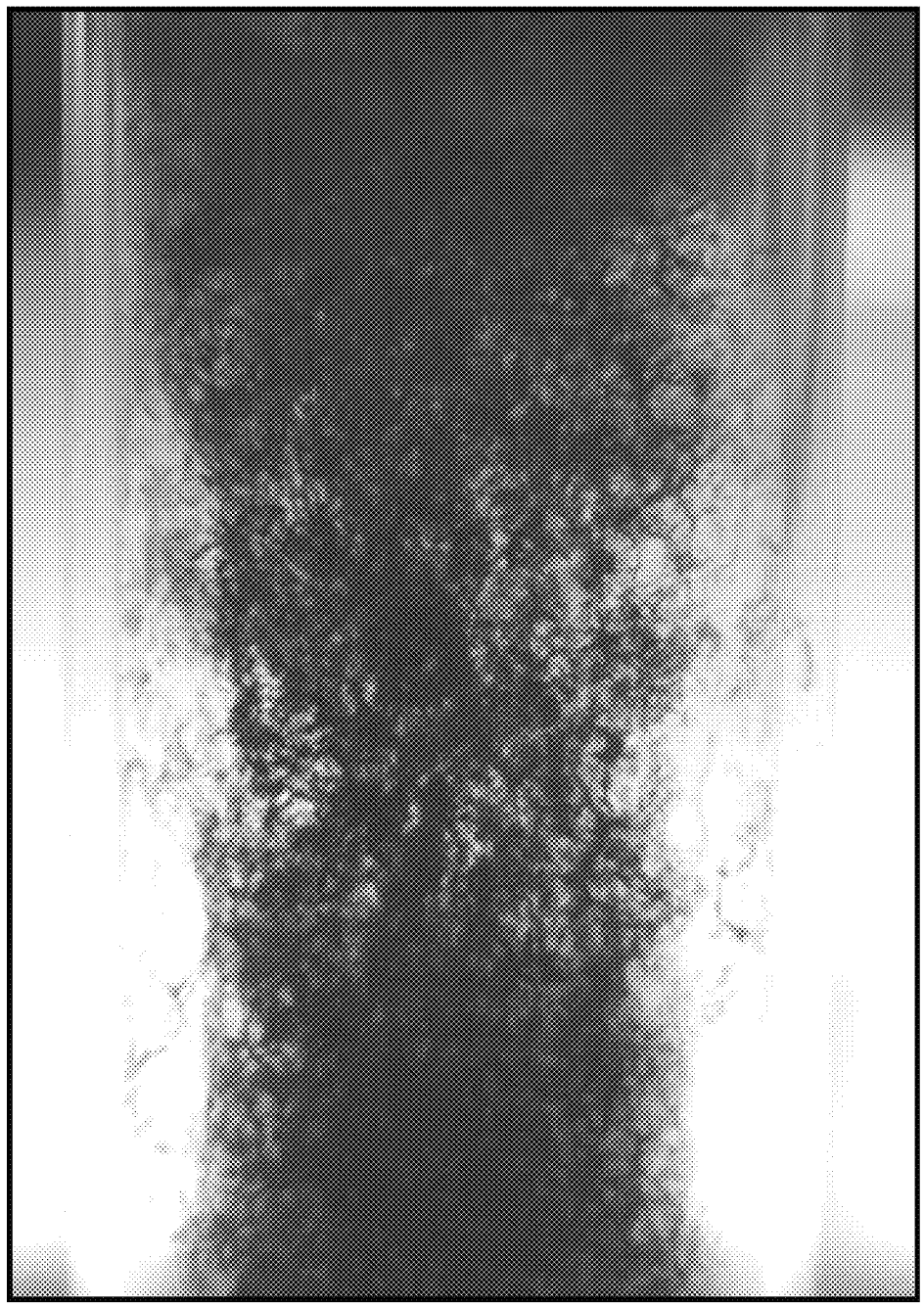
FIG. 1 shows a photograph of an illustrative carbon nanotube aerogel.

In contrast to thin films of carbon nanotubes produced by spray- or spin-coating, carbon nanotube aerogel materials can be used to produce articles having much thicker carbon nanotube layers. FIG. 1 shows a photograph of an illustrative carbon nanotube aerogel. As used herein, the term "carbon nanotube aerogel material" refers to a porous network of carbon nanotubes produced via removal of solvent from a frozen carbon nanotube solution. As used herein, the term "solution" refers to both true solutions in which carbon nanotube solubility is complete and stable suspensions in which carbon nanotubes are dispersed from one another but not fully solubilized. A number of techniques have been developed for preparing carbon nanotube aerogel materials. One particularly facile technique for forming carbon nanotube aerogel materials is described in commonly owned U.S. patent application Ser. No. 13/288,895, filed on Nov. 3, 2011 and incorporated herein by reference in its entirety. As described therein, carbon nanotube aerogel materials having a relatively uniform pore size can be obtained by subliming solvent from a concentrated solution of carbon nanotubes (i.e., by lyophilizing or freeze drying). Further details regarding carbon nanotube aerogel materials and methods for production thereof are described in more detail hereinbelow.

Figure 2A:
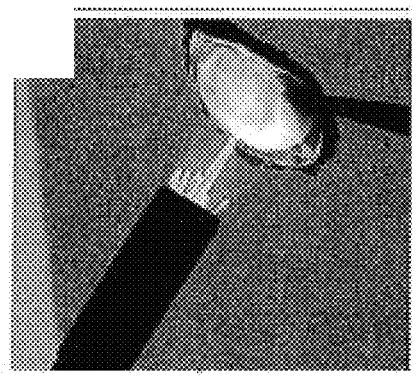
FIGS. 2A and 2B show photographs of a compressed carbon nanotube aerogel material being exposed to a MAPP flame.
Figure 2B:
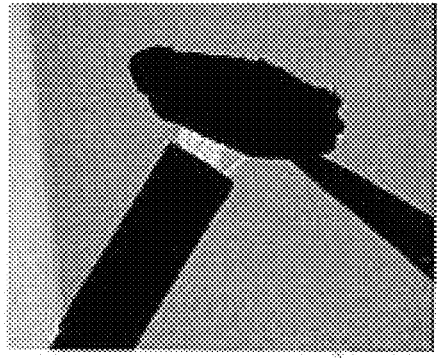
Figure 2C:
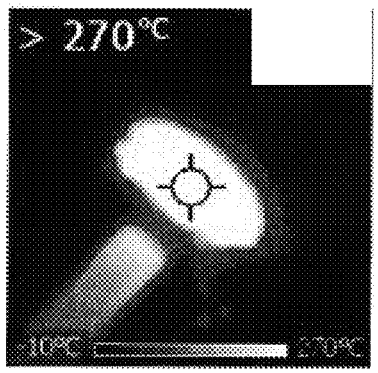
FIGS. 2C and 2D show corresponding infrared camera images.
Figure 2D:
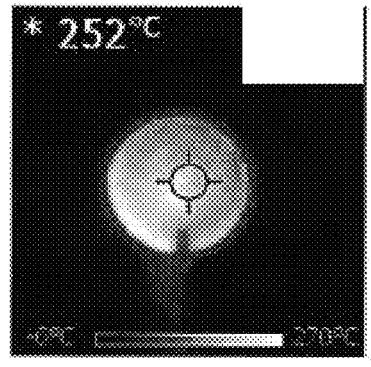

In contrast to their expected behavior, carbon nanotube aerogel materials, particularly compressed carbon nanotube aerogel materials, have surprisingly been found to display significantly different thermal properties than do mats of carbon nanotubes. Whereas individual carbon nanotubes in a mat promote heat transfer, compressed carbon nanotube aerogel materials discourage the transfer of heat between a heat source and a heat sink. For example, upon exposing a 200-500 μm thick disk of a compressed carbon nanotube aerogel material to a methylacetylene-propadiene-propane (MAPP) flame (T>2900° C.), a significant thermal gradient developed across the thickness of the compressed carbon nanotube aerogel material, as shown in FIGS. 2A-2D. FIGS. 2A and 2B show photographs of a compressed carbon nanotube aerogel material being exposed to a MAPP flame. As can be seen in FIG. 2A, the front side of the compressed carbon nanotube aerogel material that is exposed to the flame is glowing, implying a temperature of >1000° C., whereas the back side is dark, as shown in FIG. 2B, suggesting a back side temperature of <600° C. FIGS. 2C and 2D show corresponding infrared camera images. The thermal stability of compressed carbon nanotube aerogel materials in this regard is surprising in and of itself, since pristine carbon nanotubes usually oxidize in air (i.e., "burn") at these temperatures. For example, single-wall carbon nanotubes react with air to produce carbon monoxide at about 400-600° C., and multi-wall carbon nanotubes can react similarly at higher temperatures, surviving up to about 800° C. Without being bound by any theory or mechanism, it is believed that compression of an as-produced carbon nanotube aerogel material into a compressed carbon nanotube aerogel material can promote such thermal stability.

The surprising combination of thermal stability and thermal shielding properties of compressed carbon nanotube aerogel materials can allow these materials to be used in harsh environments such as, for example, space vehicles undergoing atmospheric re-entry and other structures commonly exposed to high temperature conditions. For aerospace applications, compressed carbon nanotube aerogel materials are also advantageous because they are light weight, highly conformable to a surface, and easily repaired by adding additional layers of the material.

Not only do compressed carbon nanotube aerogel materials surprisingly reduce the transfer of thermal energy between a heat source and a heat sink, but they also do so isotropically. That is, there is no specific alignment criteria needed to effectively reduce thermal transfer using a compressed carbon nanotube aerogel material. As discussed above and in marked contrast to compressed carbon nanotube aerogel materials, as-produced carbon nanotubes are anisotropic in promoting the transfer of thermal energy.

Another surprising and highly beneficial property of compressed carbon nanotube aerogel materials is that these materials display a strong thermoelectric effect. Specifically, the thermal gradient that is formed within a compressed carbon nanotube aerogel material (for example, see FIGS. 2A-2D) can result in the flow of electric current therefrom. For example, the compressed carbon nanotube aerogel material discussed above produced a current of approximately 120 μA while being heated with a MAPP flame, but essentially no current was produced while it was not being heated. At a smaller thermal gradient of about 3° C., a current of approximately 1 μA was produced. As discussed below, the thermoelectric properties of compressed carbon nanotube aerogel materials can advantageously allow waste heat to be scavenged from a system.

When a thermal gradient was established in-plane along a face of the compressed carbon nanotube aerogel material instead of across a thickness of the compressed carbon nanotube aerogel material (i.e., through-plane, as discussed above), an even larger current was produced. For example, at an in-plane thermal gradient of approximately 900° C., a current of 7.7 mA was produced (see Example 3 below). Thus, in-plane thermal gradients can be effective to generate thermoelectric currents that are over an order of magnitude higher than those generated from thermal gradients established across a thickness of the compressed carbon nanotube aerogel material.

Waste heat generation can occur in a number of fields and industries. As used herein, the term "waste heat" will refer to heat energy generated or used during a process that does not contribute to increased production. One industry in which significant waste heat generation can occur is that of electrical power generation. In nuclear, coal or other thermally based power plants, heat energy is used to generate electricity, but a significant fraction of the overall heat energy input is usually lost as waste heat, which has to be released into the environment through the use of cooling towers, flue gas discharge and the like. Although some waste heat can often be collected by conventional means, enough waste heat is usually lost such that process efficiencies of only up to about 80% are typically realized. In the automotive and aerospace industries, significant waste heat generation can also occur during the course of vehicle propulsion. In radioisotope thermoelectric generators, significant waste heat can also be formed, since the thermocouples used in such systems typically display efficiencies that are only about 10% or below.

In many instances, waste heat is generated under extreme thermal and chemical conditions that can be prohibitive for further collection and processing of the waste heat through conventional means. Conventional thermoelectric materials may not be able to withstand the extreme process conditions, or it can be difficult to integrate conventional thermoelectric materials with existing process components. In contrast, and as alluded to above, compressed carbon nanotube aerogel materials are very thermally stable and display a strong thermoelectric effect. Moreover, they can be molded into a desired shape for ready process integration, thereby achieving process compatibility without appreciably altering system performance. The electrical power generated from waste heat by the compressed carbon nanotube aerogel materials can be utilized to supplement existing power needs in a process that is generating waste heat, or the generated electrical power can be sold and/or stored (e.g., in a battery, capacitor or supercapacitor). Compressed carbon nanotube aerogel materials can also be dually advantageous in this regard, since they can also serve as an effective thermal barrier that can reduce waste heat losses from a system.

Because compressed carbon nanotube aerogel materials can effectively limit heat transfer, they can also promote retention of existing heat energy within a system. Thus, compressed carbon nanotube aerogel materials can also serve as insulation materials for use in cold environments, where the compressed carbon nanotube aerogel material can limit loss of existing heat to the cold. In this regard, compressed carbon nanotube aerogel materials can be used in articles such as home insulation, cold weather gear, and the like.

As used herein, the term "compressed carbon nanotube aerogel material" refers to an as-produced carbon nanotube aerogel material that has been decreased in volume by application of a compressive force thereto. Compressive forces can include, but are not limited to, squeezing, compacting in a hydraulic press, rolling, and the like.

As used herein, the term "thermal communication" refers to the transfer of heat energy from a heat source to a heat sink.

As used herein, the term "thermal equilibrium" refers to the condition of a heat source and a heat sink being at the same temperature.

As used herein, the term "thermal gradient" refers to a temperature differential between two faces of a compressed carbon nanotube aerogel material or between two regions within the same face of a compressed carbon nanotube aerogel material.

As used herein, the term "heat content" refers to the amount of thermal energy that is present in an object.

As used herein, the term "thermally insulating material" refers to a substance that is a poor conductor of heat energy.

The terms "heat" and "heat energy" will be used equivalently herein.

In the embodiments described herein, compressed carbon nanotube aerogel materials can be utilized for thermal management and/or for generation of electrical power from a heat source. In some embodiments, the heat source can represent waste heat. Thermal management can include both shielding an object from a heat source and retaining heat energy within an object by thermally shielding the object from a heat sink.

In some embodiments, methods described herein can include placing a compressed carbon nanotube aerogel material between an object and its surrounding environment, and establishing a thermal gradient within the compressed carbon nanotube aerogel material by exposing the compressed carbon nanotube aerogel material to the object or to the surrounding environment. The object and the surrounding environment are in thermal communication with one another, and the compressed carbon nanotube aerogel material reduces an amount of heat transferred between the object and the surrounding environment.

The thermal gradient within the compressed carbon nanotube aerogel material can be established in various manners. In some embodiments, the thermal gradient can be established across a thickness of the compressed carbon nanotube aerogel material. That is, in such embodiments, the thermal gradient can be established through-plane between two faces of the compressed carbon nanotube aerogel material. In other embodiments, the thermal gradient can be established in-plane along a face of the compressed carbon nanotube aerogel material.

The object being thermally shielded from its surrounding environment is not believed to be particularly limited, and can include both heat-producing and heat-absorbing components. Illustrative heat-producing components can include, for example, engines, exhaust manifolds, cooling towers, fluid conduits, radiators, electronics, CPUs, and the like. These heat-producing components and others can also be present in the environment surrounding a heat-sensitive object, and the object can be thermally shielded from potential thermal damage from the generated heat. Illustrative heat-sensitive objects potentially in need of thermal shielding from their surrounding environment can include, for example, thermally sensitive engine components, circuit boards, and the like.

In some embodiments, the object being thermally shielded from its surrounding environment can be sensitive to extreme cold. For example, fuel lines supplying an engine can be sensitive to extremely cold temperatures due to solidification of the fuel therein. By using a compressed carbon nanotube aerogel material for thermal shielding of a fuel line, heat loss to the surrounding environment can be reduced and the effective operating temperature range or operating time of the engine can be increased.

In some embodiments, the compressed carbon nanotube aerogel material can be utilized in an article of clothing that provides thermal protection to a wearer. In some embodiments, a wearer of the article of clothing can be protected from a heat source in the surrounding environment. Thus, the compressed carbon nanotube aerogel material can be used in personal protective equipment, such as that worn by firefighters and other personnel working in harsh thermal environments. Other materials that are routinely used in personal protective equipment can also be utilized in such articles of clothing. In other embodiments, a wearer of the article of clothing can be protected from cold temperatures by holding in body heat. Thus, the compressed carbon nanotube aerogel material can be used in cold weather gear such as coats, parkas, thermal undergarments, ponchos, hats, scarves, blankets and the like. Other materials that are routinely used in cold weather gear can also be used in such articles of clothing.

Other objects that can be thermally shielded by compressed carbon nanotube aerogel materials, from either hot or cold conditions, include for example, buildings, aerospace vehicles, submarines, and the like. When used as such, the compressed carbon nanotube aerogel material can be conformally applied to the exterior of the object, or it can be incorporated on the object's interior along with conventional insulation materials, such as fiberglass insulation, for example. In some embodiments, the compressed carbon nanotube aerogel material can be included as a layer of a laminate composite that can form a structural component of an object.

In some embodiments, the surrounding environment can be a heat sink and the object can be a heat source. That is, in such embodiments, the compressed carbon nanotube aerogel material can promote retention of heat energy within the object. When used in this manner, the compressed carbon nanotube aerogel material can decrease the loss of waste heat from the object to the surrounding environment. In this regard, the compressed carbon nanotube aerogel material can also be used to reduce the thermal output of engine components and like heat-producing objects. In extremely cold environments, existing heat energy can be retained within the object in such embodiments.

In other embodiments, the surrounding environment can be a heat source and the object can be a heat sink. That is, in such embodiments, the compressed carbon nanotube aerogel material can reduce the influx of heat energy into the object.

In some embodiments, methods described herein can include placing a compressed carbon nanotube aerogel material between an object and a heat sink that are in thermal communication with one another, the object having a heat content; establishing a thermal gradient across a thickness of the compressed carbon nanotube aerogel material by exposing the compressed carbon nanotube aerogel material to the object or to the heat sink; and maintaining at least a portion of the heat content in the object by establishing the thermal gradient across the thickness of the compressed carbon nanotube aerogel material. In some embodiments, maintaining at least a portion of the heat content in the object can include maintaining a state of thermal non-equilibrium between the object and the heat sink. That is, the carbon nanotube aerogel material can allow the object to be maintained at a temperature above that of the heat sink.

The compressed carbon nanotube aerogel material can be in thermal communication with both the object and the surrounding environment. As discussed above, the object and the surrounding environment can either be a heat source or a heat sink. To be in thermal communication with the object and the surrounding environment, the compressed carbon nanotube aerogel material can contact the object and/or the surrounding environment, or the compressed carbon nanotube aerogel material can be positioned such that heat energy can radiate from the object and/or the surrounding environment to the compressed carbon nanotube aerogel material. In some embodiments, the compressed carbon nanotube aerogel material can be in contact with the object. In some or other embodiments, the compressed carbon nanotube aerogel material can be in contact with the surrounding environment. In still other embodiments, the compressed carbon nanotube aerogel material can be in contact with both the object and the surrounding environment. In some embodiments, the surrounding environment can be a heat sink.

When exposed to high temperature conditions, such as those encountered when managing waste heat, the compressed carbon nanotube aerogel material can be exposed to a temperature ranging between about 200° C. to above about 1000° C., more particularly to a temperature ranging between about 200° C. and about 2900° C., or even above. As discussed above, the compressed carbon nanotube aerogel material can survive exposure to these conditions. These temperatures can be present in an object or in the surrounding environment of an object. In such embodiments, the object or the surrounding environment can be a heat sink that is at a lower temperature than that to which the compressed carbon nanotube aerogel material is being exposed.

In some embodiments, there can be a single layer of the compressed carbon nanotube aerogel material between the object and its surrounding environment. In other embodiments, multiple layers of the compressed carbon nanotube aerogel material can be present. Specifically, in some embodiments, there can be two or more layers of the compressed carbon nanotube aerogel material between the object and the surrounding environment, including two layers, three layers, four layers, five layers, six layers, seven layers, eight layers, nine layers, and ten layers. In some embodiments, the surrounding environment can be a heat sink. Multiple layers of the compressed carbon nanotube aerogel material can be used when fabrication of a single layer of compressed carbon nanotube aerogel material proves unfeasible (e.g., due to thickness). In other embodiments, multiple layers of the compressed carbon nanotube aerogel material can be used when it is desired to dispose other types of materials between at least some of the layers of the compressed carbon nanotube aerogel material. In some embodiments, the compressed carbon nanotube aerogel material can be included as a layer of a laminate composite that can form a structural component of an object.

In embodiments where two or more layers of the compressed carbon nanotube aerogel material are present, there can be a thermally insulating material disposed between a first layer of the carbon nanotube aerogel material and a second layer of the compressed carbon nanotube aerogel material. Suitable thermally insulating materials are not believed to be particularly limited in scope and will be familiar to one having ordinary skill in the art. Particular thermally insulating materials that can be present include resins, thermoplastic materials and inorganic materials such as alumina. Disposition of a thermally insulating material between layers of the compressed carbon nanotube aerogel material can further limit the degree of thermal communication between the object and its surrounding environment, and between the layers of the compressed carbon nanotube aerogel material. In some embodiments, there can be a thermally insulating material between each layer of the compressed carbon nanotube aerogel material. In other embodiments, only some of the layers of the compressed carbon nanotube aerogel material can have a thermally insulating material disposed therebetween. Other materials that can be disposed between the first and second layers of the compressed carbon nanotube aerogel material can include, but are not limited to, waterproof materials, sacrificial ablative materials, tensile or compressive materials, fibrous materials, sensor materials, and the like. The foregoing materials can also be used as an outer layer or an inner layer of an article containing a compressed carbon nanotube aerogel material.

Carbon nanotube aerogel materials, production thereof, and their conversion into compressed carbon nanotube aerogel materials will now be further described. In some embodiments, methods described herein can further include providing a carbon nanotube aerogel material and compressing the carbon nanotube aerogel material into a compressed carbon nanotube aerogel material. In some embodiments, the compressed carbon nanotube aerogel material can have a thickness ranging between about 200 μm and about 750 μm. In other embodiments, the compressed carbon nanotube aerogel material can have a thickness ranging between about 200 μm and about 500 μm, or between about 200 μm and about 300 μm, or between about 300 μm and about 400 μm, or between about 400 μm and about 500 μm, or between about 500 µm and about 600 µm, or between about 600 µm and about 700 µm. Factors that can influence the thickness of the compressed carbon nanotube aerogel material can include, for example, the concentration of carbon nanotubes in a frozen solution from which solvent is being removed to form the carbon nanotube aerogel material, and the degree of the compression force being applied to form the compressed carbon nanotube aerogel material.

In some embodiments, a carbon nanotube aerogel material can be prepared by freezing a solution of carbon nanotubes and then removing the solvent from the frozen solution by sublimation (i.e., by freeze drying or lyophilizing the frozen solution). In some embodiments, removing the solvent from the frozen solution can take place under vacuum. In some embodiments, the solution of carbon nanotubes can be placed in a mold or like cavity having a shape and then freezing the solution before forming the carbon nanotube aerogel material. After removing the solvent, the carbon nanotube aerogel material that remains can maintain the shape of the mold, while having a defined pore size in the resulting aerogel structure. Optional machining to a desired shape can take place after removing the carbon nanotube aerogel material from the mold.

In some embodiments, the carbon nanotube aerogel material can have a pore size that ranges between about 2 nm to about 50 nm. In some embodiments, the carbon nanotube aerogel material can have a pore size that ranges between about 15 nm to about 35 nm, or between about 20 nm to about 30 nm. In some embodiments, an average pore size of the carbon nanotube aerogel material can range between about 15 nm to about 30 nm, or between about 20 nm to about 30 nm, including about 20 nm, about 21 nm, about 22 nm, about 23 nm, about 24, nm, about 25 nm, about 26 nm, about 27 nm, about 28 nm, about 29 nm or about 30 nm. The pore size can be retained after compression of the carbon nanotube aerogel material into a compressed carbon nanotube aerogel material. The pore size of the carbon nanotube aerogel material can be determined by a number of factors including, for example, the lengths of the carbon nanotubes and the concentration of carbon nanotubes in the solution that is sublimed to form the carbon nanotube aerogel material. Optionally, the pores of the carbon nanotube aerogel material can be filled with substances such as, for example, nanoparticles, polymers, resins and the like. In some embodiments, filling the pores with an insulating material can further enhance the thermal shielding effects that compressed carbon nanotube aerogel materials can provide. Filling of the pores with a polymer material or resin, for example, can take place by a technique such as, for example, vacuum bagging.

In some embodiments, the carbon nanotube aerogel material or a compressed carbon nanotube aerogel material produced therefrom can have a substantially uniform pore size. In some embodiments, a few pores that exhibit outlier pore sizes may be produced. In some embodiments, the carbon nanotube aerogel material or compressed carbon nanotube aerogel material can have less than about 10% outlier pore sizes, or less than about 1% outlier pore sizes, or less than about 0.1% outlier pore sizes. In general, outlier pore sizes are usually larger than about 50 nm in size.

The type, length or diameter of the carbon nanotubes used to form the carbon nanotube aerogel materials are not believed to be particularly limited. As discussed above, the carbon nanotube length can, at least in part, determine a pore size of the carbon nanotube aerogel material obtained following sublimation of the solvent.

In some embodiments, the carbon nanotubes can have a length that ranges between about 0.5 µm and 500 µm, including all subranges thereof. In some embodiments, the carbon nanotubes can have a length that ranges between about 0.5 µm and about 5 µm, or between about 1 µm and about 10 µm, or between about 5 µm and about 20 µm, or between about 20 µm and about 50 µm, or between about 50 µm and about 100 µm, or between about 100 µm and about 500 µm.

In some embodiments, the carbon nanotubes can have a diameter that ranges between about 1 nm to about 500 nm, including all subranges thereof. In some embodiments, the carbon nanotubes can have a diameter that ranges between about 1 nm and about 5 nm, or between about 1 nm and about 10 nm, or between about 5 nm and about 20 nm, or between about 20 nm and about 50 nm, or between about 50 nm and about 100 nm.

The types of carbon nanotubes used in forming the carbon nanotube aerogel materials are not believed to be particularly limited and can include single-wall carbon nanotubes, double-wall carbon nanotubes, multi-wall carbon nanotubes, and mixtures thereof. The carbon nanotubes used in forming the carbon nanotube aerogel materials can prepared in any manner, known or presently unknown. A number of carbon nanotube synthesis techniques will be familiar to a person having ordinary skill in the art. The techniques can include, for example, arc discharge across graphite electrodes, pulsed laser ablation of graphite feedstock materials, chemical vapor deposition, and the like. In some embodiments, the carbon nanotubes can be a carbon nanostructure that contains crosslinked carbon nanotubes, carbon nanotubes having shared walls, dendritically branched carbon nanotubes and the like. Carbon nanostructures can be prepared through continuous growth on a fiber substrate, as described in U.S. Patent Applications 61/707,738, filed on Sep. 28, 2012, and Ser. No. 13/655,348, filed on Oct. 18, 2012, each of which is incorporated herein by reference in its entirety. In other embodiments, crosslinked carbon nanotubes can be prepared by exposing carbon nanotubes to microwave radiation, as described in U.S. Pat. No. 8,080,199, which is incorporated herein by reference in its entirety.

In some embodiments, the carbon nanotubes can be functionalized. Functionalization of the carbon nanotubes can increase their solubility in a solvent such that a stable dispersion or true solution of the carbon nanotubes can be attained. Suitable organic functionalities and functionalization techniques for carbon nanotubes will be familiar to one having ordinary skill in the art. Illustrative functional groups that can be added to carbon nanotubes include, for example, carboxylic acids, amines, alcohols, amides, esters, halogens (e.g., fluoride, chloride, bromide and iodide), sulfides, sulfates, and the like. The functional groups can be introduced to the ends or sidewalls of the carbon nanotubes. In some embodiments, the ends of the carbon nanotubes can be opened through oxidation, and carboxylic acid groups can be obtained on the open ends of the carbon nanotubes.

In some embodiments, the carbon nanotube aerogel materials can be formed from a solution of carbon nanotubes that is free of surfactants, polymers, emulsifiers or like solubilizing agents. Without being bound by any theory or mechanism, it is believed that the presence of these types of solubilizing agents can disrupt the formation of uniform pores in the carbon nanotube aerogel materials following sublimation of the solvent. In some embodiments, the solution of carbon nanotubes can be an aqueous solution. In some embodiments, the aqueous solution can include water alone as a solvent. In other embodiments, one or more water-soluble organic solvents can also be included to promote solubility of the carbon nanotubes in the aqueous solution. Particular water-soluble organic solvents that can be present when forming carbon nanotube aerogel materials can include, for example, methanol, ethanol, acetonitrile, acetone, tetrahydrofuran and the like. In some embodiments, supercritical carbon dioxide can be used in forming the solution of carbon nanotubes.

In some embodiments, the solution of carbon nanotubes used for forming the carbon nanotube aerogel materials can have a carbon nanotube concentration ranging between about 1% and about 60% carbon nanotubes by weight. In some or other embodiments, the solution of carbon nanotubes can have a carbon nanotube concentration ranging between about 5% and about 50% carbon nanotubes by weight, or between about 10% and about 20% carbon nanotubes by weight, or between about 20% and about 30% carbon nanotubes by weight, or between about 30% and about 40% carbon nanotubes by weight, or between about 40% and about 50% carbon nanotubes by weight. In some embodiments, a solution of carbon nanotubes residing within the above concentration ranges can be prepared by slowly evaporating the solvent from a more dilute solution of carbon nanotubes. For example, a 1% by weight solution of carbon nanotubes can be concentrated to a higher concentration through evaporation of the solvent. In some embodiments, the evaporation rate can be increased by bubbling an inert gas such as nitrogen through the solution of carbon nanotubes.

In some embodiments, the carbon nanotube aerogel material can be formed by subliming a frozen concentrated aqueous solution of carbon nanotubes. In some embodiments, subliming can take place under vacuum, such as under a pressure of about 1 torr or less or a pressure of about 0.5 torr or less. In some embodiments, the aqueous solution can be placed in a mold before being frozen and undergoing sublimation. In some embodiments, a release agent can be disposed in the mold to facilitate removal of the carbon nanotube aerogel material from the mold once solvent sublimation is complete.

Once a carbon nanotube aerogel material has been formed as generally described above, the carbon nanotube aerogel material can then be subjected to a compression force to form a compressed carbon nanotube aerogel material. The type of compression force is not believed to be particularly limited. The type and amount of compression force applied can be dependent upon the desired thickness and density of the carbon nanotube aerogel material after compression. In some embodiments, the compression force can be applied by a hydraulic press. In such embodiments, the compression force can be up to about 25 tons. In other embodiments, a smaller compression force can be applied by techniques such as squeezing, vacuum bagging, or rolling the as-produced carbon nanotube aerogel material.

In some embodiments, the compressed carbon nanotube aerogel material can be used to generate electrical power while limiting the transfer of heat energy between an object and its surrounding environment. Generation of the electrical power can take place while the compressed carbon nanotube aerogel material is serving in a thermal management function, as generally described above. In some embodiments, the electrical power can be generated by placing the compressed carbon nanotube aerogel material in thermal communication with waste heat, and converting at least a portion of the waste heat into electrical power. Once produced, the electrical power can be returned to the process generating waste heat, provided to another process to meet at least a portion of its power consumption requirements, returned to the electrical grid, sold, or stored. Storage of the generated electrical power can take place using any type of device that is capable of storing electrical charge, such as batteries, capacitors, supercapacitors, and the like.

As described above, thermoelectric generation from the compressed carbon nanotube aerogel material can take place through establishment of a thermal gradient across a thickness of the compressed carbon nanotube material or in-plane across a face of the compressed carbon nanotube aerogel material. In some embodiments, methods described herein can include generating an electric current from the compressed carbon nanotube aerogel material by establishing a thermal gradient across a thickness of the compressed carbon nanotube aerogel material or in-plane across a face of the compressed carbon nanotube aerogel material. Once produced, in some embodiments, the methods can further include supplying the electric current to an energy-storage device, such as a battery, a capacitor, or a supercapacitor. Suitable batteries, capacitors, and supercapacitors can be those conventionally employed in the art, or they can be enhanced with nanomaterials, including carbon nanotubes and carbon nanotube aerogel materials. In some or other embodiments, once formed, the electric current can be supplied to an energy-consuming device, and the electric current can be used to power the energy-consuming device, at least in part. In general, any device that uses electrical power in its operation can be at least partially powered with the electric current generated from the compressed carbon nanotube aerogel material. Illustrative energy-consuming devices can include, for example, electronics, engines, lighting, heating and cooling systems, and the like.

Although the generation of electric current from the compressed carbon nanotube aerogel material has been described above in reference to exposure of the compressed carbon nanotube aerogel material to extreme heat, it is to be recognized that a thermal gradient can also be established through exposure to extreme cold. Thus, exposure to extreme cold can also be used to generate an electric current from the compressed carbon nanotube aerogel material. However, extreme thermal gradients can be more difficult to establish at cold temperatures, so the generated electrical currents may be smaller.

In some embodiments, articles containing compressed carbon nanotube aerogel materials are described herein. In some embodiments, the articles can include one or more outer layers, and one or more inner layers that contain a compressed carbon nanotube aerogel material, where at least one of the inner layers contacts an outer layer. In some embodiments, the one or more outer layers can be a textile fabric. In some embodiments, one or more inner layers containing a compressed carbon nanotube aerogel material can be disposed between two outer layers of a textile fabric.

In some embodiments, the textile fabric of the outer layer can be made of a flame-resistant material. Suitable flame-resistant materials will be familiar to one having ordinary skill in the art. Such articles can confer both flame- and thermal protection to a user. Illustrative articles containing a flame-resistant outer layer can include, for example, firefighter coats and pants, fire blankets, thermal gloves, and the like.

In some embodiments, the textile fabric of the outer layer can be made of a thermally insulating and/or water-resistant material. Suitable thermally insulating materials will be familiar to one having ordinary skill in the art and can include, for example, those conventionally used in wet suits, jackets, parkas, thermal undergarments, blankets, and the like. Illustrative articles that contain a thermally insulating or water-resistant outer layer can include, for example, wet suits, jackets, parkas, thermal undergarments, blankets, and the like.

In some embodiments, the outer layer can be made of paper, plastic, or a like material, such as those used in fiberglass insulation.

In some embodiments, the articles can contain multiple layers of the compressed carbon nanotube aerogel material as the one or more inner layers. In some embodiments, there can be a thermally insulating material disposed between a first layer of the compressed carbon nanotube aerogel material and a second layer of the compressed carbon nanotube aerogel material, as generally described above. In some embodiments, the thermally insulating material disposed between the first and second layers of the compressed carbon nanotube aerogel material can be the same as that forming the one or more outer layers of the article. In other embodiments, the thermally insulating material disposed between the first and second layers of the compressed carbon nanotube aerogel material can be different than that forming the one or more outer layers of the article.

The foregoing articles will now be described in further detail with reference to the drawings. FIGS. 3-6 depict various articles containing layers of compressed carbon nanotube aerogel materials. Any of the articles generally depicted in the FIGURES can be fabricated into the specific articles described in further detail above.

Figure 3:
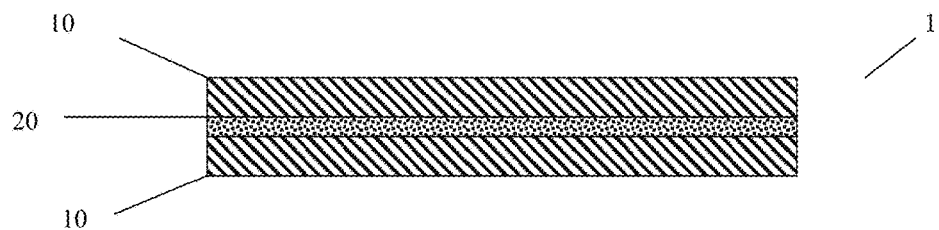
FIGS. 3-6 depict various articles containing layers of compressed carbon nanotube aerogel materials.
Figure 4:
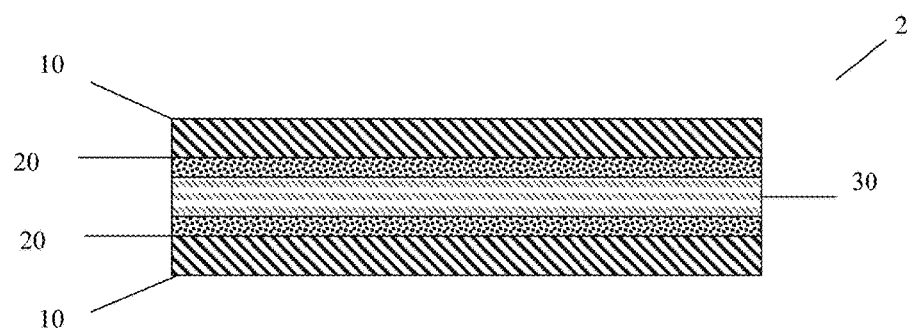
Figure 5:
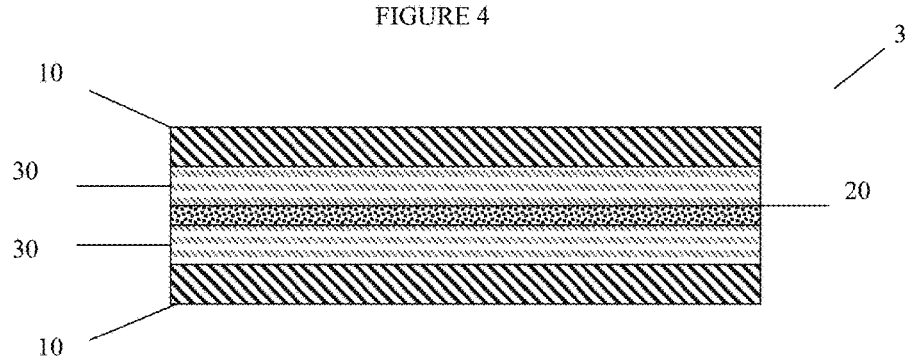
Figure 6:

With reference to FIG. 3, article 1 contains compressed carbon nanotube aerogel material layer 20 disposed between outer layers 10. In FIG. 4, article 2 contains two compressed carbon nanotube aerogel layers 20 disposed between outer layers 10. An additional thermally insulating layer 30 is disposed between compressed carbon nanotube aerogel layers 20 in article 2. In FIG. 5, article 3 contains a single compressed carbon nanotube aerogel material layer 20 disposed between two thermally insulating layers 30. Compressed carbon nanotube aerogel material layer 20 and the two thermally insulating layers 30 are disposed between outer layers 10 in article 3. In FIG. 6, article 4 differs from article 2 of FIG. 4 in that there are only singular occurrences of outer layer 10 and compressed carbon nanotube aerogel layer 20.

To facilitate a better understanding of the embodiments described herein, the following experimental examples are provided. The examples are provided for purposes of illustration only and should be considered non-limiting.

EXAMPLES

Example 1: Preparation of a Concentrated Solution of Carbon

Nanotubes.

An aqueous solution of CVD carbon nanotubes having an optical density of 2.0 was prepared. The solution was then filtered to remove contaminants of 4 microns or greater in size. Filtration was conducted with a McMaster-Carr 4 micron 304 stainless steel mesh over a polystyrene funnel. Filtration was conducted by gravity after wetting the filter with isopropanol. The filtered solution was transferred to a 500 mL polypropylene or polytetrafluoroethylene Erlenmeyer flask inside a vacuum oven. The vacuum oven was evacuated to about 20 inches of mercury, and an $N_2$ vent was opened just enough to deflect the vacuum gauge. Evaporation was conducted at 50° C., producing an evaporation rate of approximately 3-5 mL/hr. Once the solution of carbon nanotubes had reached a desired concentration, the solution was removed from the oven for use.

Example 2: Production of a Carbon Nanotube Aerogel Material

The concentrated solution of Example 1 was used to fill a mold, and the solution was then frozen in a common freezer. Thereafter, the filled mold was transferred to a vacuum chamber, which was evacuated to a pressure of less than about 1 torr. Once solvent removal was complete, the carbon nanotube aerogel material was removed from the vacuum chamber. FIG. 1 shows a photograph of an illustrative carbon nanotube aerogel material produce by vacuum sublimation. The as-produced carbon nanotube aerogel material was compressed with a 25 ton compression force in a hydraulic press to form a compressed carbon nanotube aerogel material.

Example 3: Thermal Gradient in a Compressed Carbon Nanotube Aerogel Material

A compressed carbon nanotube aerogel material weighing 1.5 grams was placed in a MAPP flame for 3 minutes, approximately 1 inch from the flame source. The flame temperature was greater than 1000° C. After 3 minutes, the compressed carbon nanotube aerogel material was removed from the flame, and the back side temperature of the compressed carbon nanotube aerogel material was measured using a thermocouple following a 1 second cool down period. Table 1 shows the back side temperatures at various times following removal from the flame. As can be seen from the data, the back side temperature was much lower than the flame temperature being applied to the front side of the compressed carbon nanotube aerogel material. In addition, cool down occurred fairly rapidly.

TABLE 1

| Cooling Time (s) | Temperature (° F.) |
|---|---|
| 0 | >1000 |
| 1 | 220 |
| 2 | 190 |
| 5 | 121 |
| 10 | 80 |
| 20 | 76 |

As discussed above, the through-plane thermal gradient produced a thermoelectric current of approximately 120 μA. When the thermal gradient was established in-plane instead of through-plane as above, an even larger thermoelectric current was produced. For example, at an in-plane thermal gradient of approximately 900° C. (flame temperature of approximately 1000° C. minus a measured temperature of 87° C. opposite the position of the flame on the same face of the compressed carbon nanotube aerogel material), a thermoelectric current of 7.7 mA was produced. The in-plane thermal gradient was established and measured by heating the edge of the compressed carbon nanotube aerogel disk with a propane flame and measuring the temperature and current at a point opposite the location of the flame. Even though the in-plane thermal gradient was apparently somewhat lower than that established through-plane, the thermoelectric current generated was considerably higher.

Although the invention has been described with reference to the disclosed embodiments, those skilled in the art will readily appreciate that these are only illustrative of the invention. It should be understood that various modifications can be made without departing from the spirit of the invention. The invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is the following:

1. A method comprising:
   placing a compressed carbon nanotube aerogel material between an object and a heat sink that are in thermal communication with one another, the object having a heat content;
   establishing a thermal gradient across a thickness of the compressed carbon nanotube aerogel material by exposing the compressed carbon nanotube aerogel material to the object or to the heat sink;
   maintaining at least a portion of the heat content in the object by establishing the thermal gradient across the thickness of the compressed carbon nanotube aerogel material; and
   generating an electric current from the compressed carbon nanotube aerogel material by establishing the thermal gradient.

2. The method of claim 1, wherein the compressed carbon nanotube aerogel material is in contact with the object, the heat sink, or both the object and the heat sink.

3. The method of claim 1, wherein maintaining at least a portion of the heat content in the object comprises maintaining a state of thermal non-equilibrium between the object and the heat sink.

4. The method of claim 1, wherein there are two or more layers of the compressed carbon nanotube aerogel material between the object and the heat sink.

5. The method of claim 4, wherein there is a thermally insulating material disposed between a first layer of the compressed carbon nanotube aerogel material and a second layer of the compressed carbon nanotube aerogel material.

6. The method of claim 1, wherein the compressed carbon nanotube aerogel material has a thickness ranging between about 200 μm and about 750 μm.

7. The method of claim 1, further comprising:
   supplying the electric current to an energy-storage device.

8. The method of claim 1, further comprising:
   supplying the electric current to an energy-consuming device; and
   powering the energy-consuming device, at least in part, with the electric current.

9. An article comprising:
   one or more outer layers; and
   one or more inner layers comprising a compressed carbon nanotube aerogel material, at least one of the inner layers contacting an outer layer,
   wherein the compressed carbon nanotube aerogel material has a substantially uniform pore size ranging between about 2 nm to about 50 nm having less than about 10% outlier pore sizes.

10. The article of claim 9, further comprising:
    a thermally insulating material disposed between a first layer of the compressed carbon nanotube aerogel material and a second layer of the compressed carbon nanotube aerogel material.

11. The article of claim 9, wherein the one or more outer layers comprise a textile fabric.

12. The article of claim 9, wherein the one or more outer layers comprise a water-resistant material.

13. The article of claim 9, further comprising:
    an energy-storage device or an energy-consuming device in electrical communication with the compressed carbon nanotube aerogel material.

14. The article of claim 9, wherein the compressed carbon nanotube aerogel material has a thickness ranging between about 200 μm and about 750 μm.

* * * * *